United States Patent [19]

Gilcher

[11] 4,200,856
[45] Apr. 29, 1980

[54] DIFFERENTIAL CLAMP-ON RAILWAY VEHICLE WHEEL DETECTOR

[75] Inventor: Heinz Gilcher, Export, Pa.

[73] Assignee: Westinghouse Air Brake Company, Swissvale, Pa.

[21] Appl. No.: 911,630

[22] Filed: Jun. 1, 1978

[51] Int. Cl.² ............................................ H01L 1/22
[52] U.S. Cl. ...................................... 338/5; 246/249; 338/2
[58] Field of Search ............... 338/2, 5, 47; 73/141 A, 73/88.5 R, 88.5 SD, 146; 246/249, 251; 177/163, 211, DIG. 8

[56] References Cited

U.S. PATENT DOCUMENTS

| | | | |
|---|---|---|---|
| 3,009,056 | 11/1961 | Bone et al. | 177/211 X |
| 3,234,777 | 2/1966 | Joy | 177/211 X |
| 3,447,367 | 6/1969 | Taylor | 338/5 X |
| 3,448,424 | 6/1969 | Laimins | 177/163 X |
| 3,863,192 | 1/1975 | Grey | 338/2 |
| 4,047,144 | 9/1977 | Wong | 338/2 |

FOREIGN PATENT DOCUMENTS

| | | | |
|---|---|---|---|
| 765499 | 1/1957 | United Kingdom | 177/163 |
| 797161 | 6/1958 | United Kingdom | 177/163 |

*Primary Examiner*—C. L. Albritton
*Attorney, Agent, or Firm*—J. B. Sotak; R. W. McIntire, Jr.

[57] ABSTRACT

A railway car wheel detection arrangement employing a pair of clamp-on sensor units which are spaced apart a given distance and are positioned on the upper surface of the base flange of the track rail. Each of the sensor units includes an elongated epoxy glass board member having a reduced intermediate portion to which is attached a strain gage element. A pair of C-shaped clamps securely holds each of the sensor units to the base flange of the rail. The strain gage element is placed in tension by the stress in the track rail under the load of a wheel of a railway car to vary its resistance value which results in the unbalancing of a differential bridge circuit to produce a signal signifying the presence of a car wheel.

10 Claims, 8 Drawing Figures

DIFFERENTIAL CLAMP-ON RAILWAY VEHICLE WHEEL DETECTOR

FIELD OF THE INVENTION

This invention relates to a railway vehicle wheel sensor and, more particularly, to a differential strain gage wheel detecting arrangement employing a pair of spaced apart strain gage elements which are clamped onto the base of the running rail for detecting the incidence of a wheel of a vehicle by sensing the change of stress which occurs in the base of the running rail.

BACKGROUND OF THE INVENTION

In certain railroad operations, such as, in the separation and sorting of incoming trains in a classification yard, it is necessary to detect the presence of railway cars at various locations along their route of travel to the selected class tracks. For example, in an automatic humping operation, it is common practice to employ frictional braking apparatus or car retarders for controlling the speed of the freely-moving vehicles in order to ensure that the vehicles safely reach their destination and/or properly couple with other vehicles standing in the appropriate class track. In order to apply the appropriate braking force to the sides of the passing wheels, it is essential to detect and determine when a railway vehicle is within the confines of the car retarder apparatus. While numerous types of wheel detectors have operated satisfactorily in certain installations, it has been found that these previous wheel detectors are not suitable for car retarder applications. For example, many of the prior art detectors are relatively large and bulky, and therefore, they do not lend themselves to the confined quarters and limited amount of space which is available in a retarder installation. That is, the use of conventional wheel detectors in a frictional-gripping type of car retarder is not plausible since the clearance requirements cannot be met so that proper operation of the retarder is not possible. In addition, the previous wheel detectors were susceptible to damage and even destruction by automatic ballast cleaning and tampering equipment as well as by dragging equipment. Further, magnetic types of car detectors are adversely affected by the great amount of iron and steel that make up the massive retarders. In one case, it was proposed to drill holes in the top of the head of the running rails and to insert and cement magnetic coils therein to detect the passing wheels of moving railway vehicles. However, this proposal was not acceptable in that the drilled holes weakened the rails and could lead to fatigue and cracks and eventual failure of the running rails. In addition, the extreme vibrations, pounding, as well as the thermal expansion and contraction of the rail adversely affects the operation of conventional types of magnetic mechanical and light responsive types of wheel detectors in a railway car retarder installation.

OBJECTS OF THE INVENTION

Accordingly, it is an object of this invention to provide a new and improved wheel detector for railway vehicles.

Another object of this invention is to provide a novel differential wheel sensing device which is relatively small and compact and fits onto the flange of the track rail.

A further object of this invention is to provide a unique differential strain gage wheel detecting device which is fixedly secured to the base flange of a running rail.

Still another object of this invention is to provide an improved clamp type of a differential wheel sensor which detects the passing wheels of railway cars by detecting the force exerted on the base flange of a running rail.

Still a further object of this invention is to provide a differential type of clamp-on strain gage wheel detector which is mounted to the flange portion of a track rail to sense a change in the load on the track rail due to the presence of a railway vehicle.

Yet another object of this invention is to provide a clamp-on pressure sensitive detector for detecting the wheel of a passing vehicle by sensing an increase in the load pressure.

Yet a further object of this invention is to provide a unique differential detecting device for sensing the passage of moving objects comprising an epoxy glass member having an elongated upper planar surface, a strain gage member including a resistance element bonded to the upper planar surface, a support structure for supporting the moving objects, the epoxy glass member clamped onto the support structure for causing the strain gage member to detect the strain which is exerted on the support structure under the load of passing objects.

An additional object of this invention is to provide a unique and improved railway car wheel detector arrangement which is simple in design, economical in cost, reliable in operation, durable in service, dependable in performance and efficient in use.

SUMMARY OF THE INVENTION

In accordance with the present invention, there is provided a new and unique differential wheel detecting arrangement for sensing the presence of the wheels of railway vehicles. The wheel detector includes a pair of load responsive sensor units which are spaced apart a given distance and are positioned at a given location along the trackway. Each of the sensor units includes an elongated printed circuit board which includes a centrally reduced portion. A pair of identations are formed near each end of the elongated printed circuit board. A silicon strain gage resistive element is bonded to the centrally reduced portion of the printed circuit board. The printed circuit boards are placed on the top of the flange of the track rail and are clamped to the track rail. A pair of C-shaped clamps are slipped over the flange of the rail and the tips of hold-down screws are aligned with the indentations and are tightened down to firmly hold the sensor units in place. A pair of conductive leads are connected to the respective ends of each of the strain gage resistive elements and, in turn, are connected to a terminal block. The terminal block is attached to the inside of a protective cover which is adapted to be secured to adjacent crossties of the trackway. A heavy duty cable connects the resistive elements to the respective arms of a differential bridge network. When the wheel of a railway vehicle passes over the sensor member, the load on each wheel places the respective strain gage element in tension so that resistance value of the respective resistive element varies and causes an unbalance of the bridge network. The unbalancing of the bridge network occurs as the wheel passes over each sensor so that the change in resistance will indicate the presence of a railway vehicle. The use of two strain gage resistive elements in a bridge network results in a differential action which nulls out or balances out the effects of expansion and contraction of the track rail and thermal drift of the strain gage elements as well as moment induced strains and impacts caused by flat spots on the wheels of passing vehicles.

BRIEF DESCRIPTION OF THE DRAWINGS

Other objects, features and advantages of the present invention will become more readily apparent from the following detailed description of the preferred embodiment when read with reference to and considered in conjunction with the accompanying drawings which form part of this disclosure, in which.

DETAILED DESCRIPTION OF THE INVENTION

Figure 1:
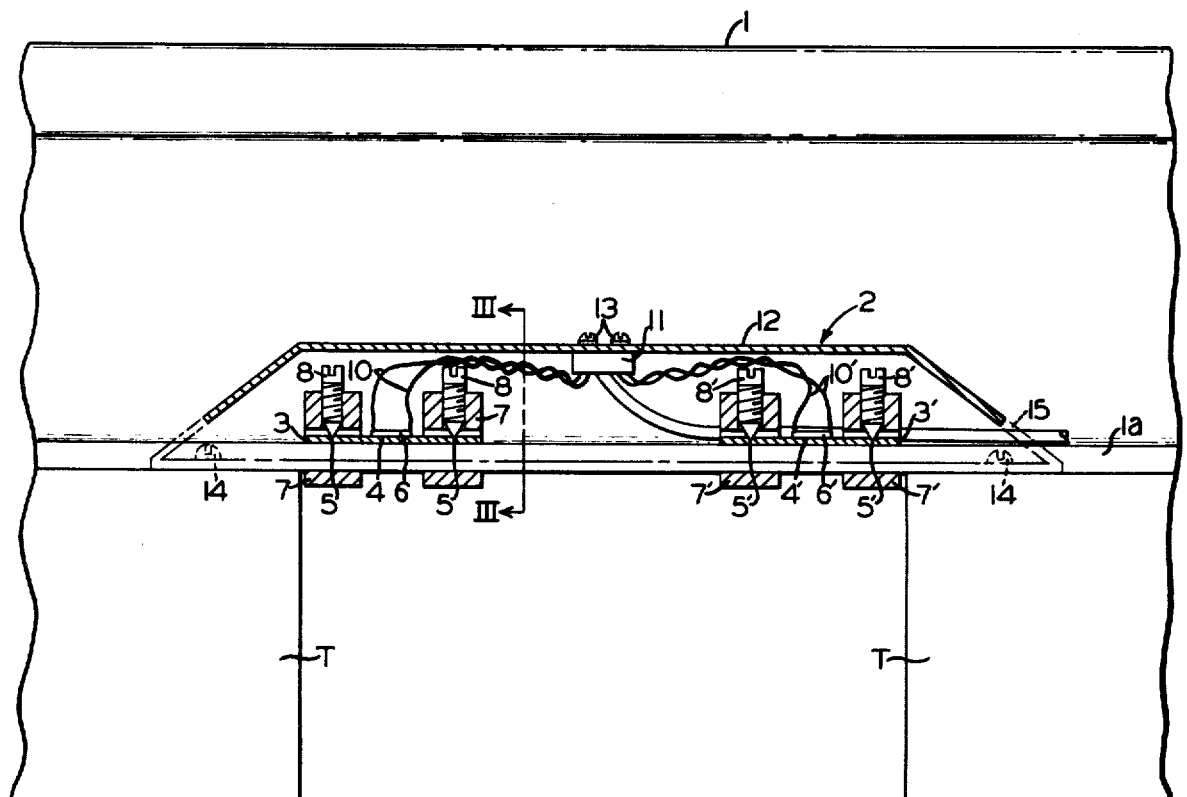
FIG. 1 is a side elevational view partially in section of a clamp-on strain gage sensor or transducer detecting unit, showing the unit mounted to a track or running rail of a section trackway in accordance with the present invention.
Figure 2:
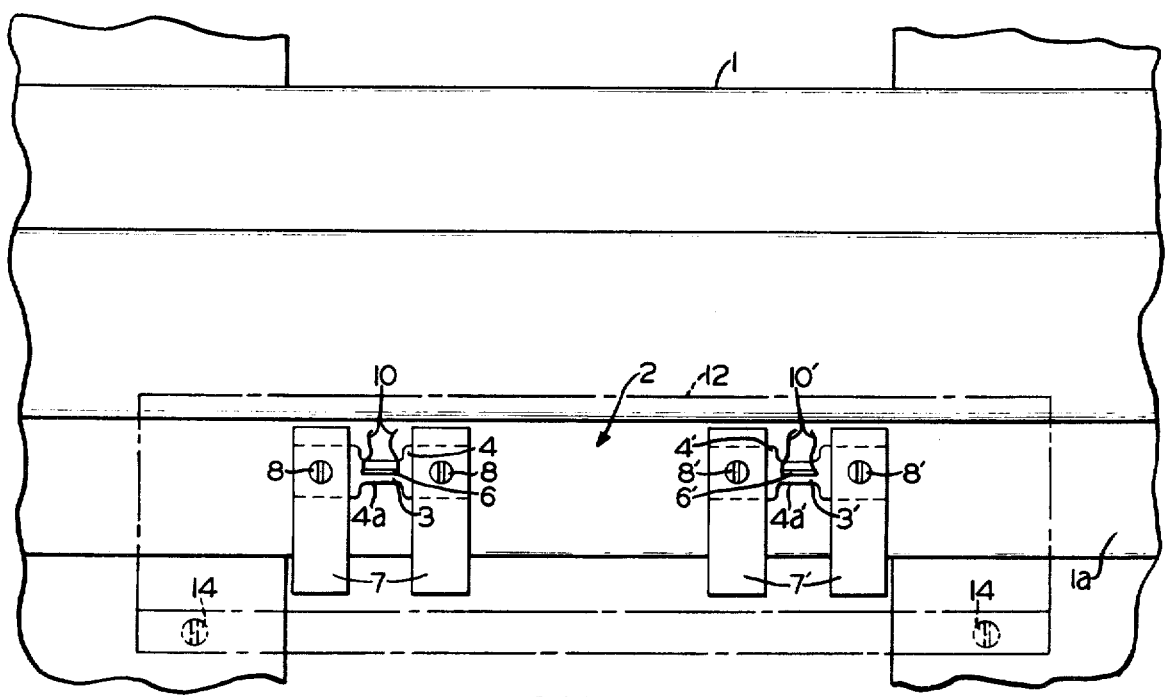
FIG. 2 is a top plan view of the sensing unit of FIG. 1 with the protective cover shown in phantom to illustrate the disposition and details of the strain gage sensor or detector in relationship to the track rail.
Figure 3:
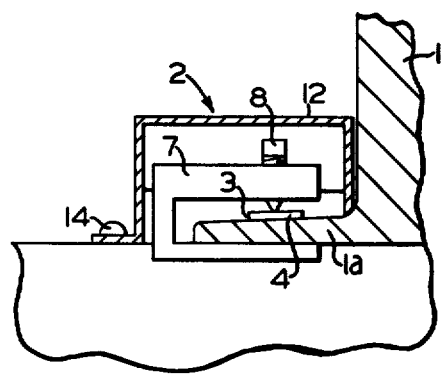
FIG. 3 is a cross sectional end view of the sensor unit taken along lines III—III of FIG. 1.

Referring now to the drawings and in particular to FIGS. 1, 2, and 3, there is shown a standard track or running rail 1 over which the flanged wheels of railway cars or vehicles travel. In practice, the track rail 1 may be disposed within the confines of a frictional braking apparatus or car retarder in a classification yard where the clearance or amount of available space is at a premium. As shown, the sensor or detector unit which is generally characterized by numeral 2 is adapted to be mounted within the protected region or vertical boundry of the track rail 1 so as to minimize any possible damage to the unit by maintenance-of-way equipment as well as vehicle-carried equipment. That is, the sensing or detecting unit is situated within the vertical planar limits of the base flange portion 1a so that there is little, if any, possible damage and destruction by ballast undercutter/cleaners and tampers during rail maintenance periods or by dragging equipment, such as, broken brake riggings, loose and bent safety bars or the like from passing vehicles.

As shown in FIGS. 1 and 2, the detecting device 2 includes a pair of sensing units 3 and 3' each of which includes a substrate body member 4 and 4', respectively.

Figure 4:
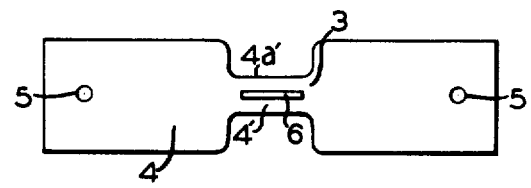
FIG. 4 is a top plan view of one of the strain gage sensing units used in the detecting arrangement of FIG. 1.

Each body member is constructed of a flat insulative material, such as, a printed circuit or polyglass board each of which has a similar or identical configuration. Thus, the flat body member 4 and 4' operate as the supporting medium for the variable resistance strain gage elements as will be described presently. It will be noted from viewing FIGS. 2 and 4 that members 4 and 4' are substantially rectangular or elongated bodies having a centrally reduced portion 4a and 4a'. That is, the intermediate parts or segments of each side of members 4 and 4' are cut out to form a necked-down portion 4a and 4a', respectively, the purpose of which will be described hereinafter. Further, a pair of indentations or dimples 5 are formed near the outer ends of the flat base member 4. Similarly, two indentations 5' are centrally located with the respective ends of the insulative body member 4'. As mentioned above, the base members 4 and 4' are constructed of printed circuit material which is somewhat pliant to permit a slight flexure to occur under a load or stressed condition. As shown in FIGS. 1, 2 and 4, the top planar surface of each of the insulative members 4 and 4' has attached thereto silicon strain gage elements 6 and 6' each of which senses the amount of flexure that takes place under a compressive load. The strain gage sensing device 6 is substantially identical to element 6', and each consists of an elongated strip of pressure sensitive silicon material which is bonded and sealed to the respective base supporting printed circuit board by an epoxy adhesive or the like. Each of the elongated silicon resistive elements 6 and 6' varies its resistance value in proportion to the amount of stress imparted deformation.

In practice, the printed circuit boards 6 and 6' are situated upon the upper surface of the base flange portion 1a of the running rail 1. It will be seen that the sensing units 3 and 3' are spaced apart a given distance which may be dependent upon the maximum speed that the railway devices pass the detection zone. The units are each held in place by a pair of C-shaped clamps 7, 7 and 7', 7'. The clamping members are slipped over the end of the outer extremity of the flange portion 1a and the pointed ends of the tie-down screws 8, 8' are aligned with the indentations 5, 5'. Next, the screws 8, 8' are tightened to securely hold the unit in fixed relationship to the flange 1a of the track rail 1. As shown, the respective ends of the twisted pair of leads 10 and 10' are connected to the respective ends of the strain gage resistive elements 6 and 6', and the remote ends are connected to a suitable terminal block 11 which is secured to the inside top of a protective metal cover 12 by a pair of machine screws 13. The cover 12 straddles two adjacent crossties T which support the track rail 1 in a conventional manner. The cover 12 is held in place by wood screws 14 which are threaded into the tops of the two adjacent crossties T.

As shown in FIG. 1, a hole is provided in one end of the cover member 12 for accommodating a heavy-duty four lead cable 16 which extends from the terminal block 12 to a convenient wayside location where the complementary electronic circuitry is housed in an appropriate wayside cabinet or control office.

Figure 5:
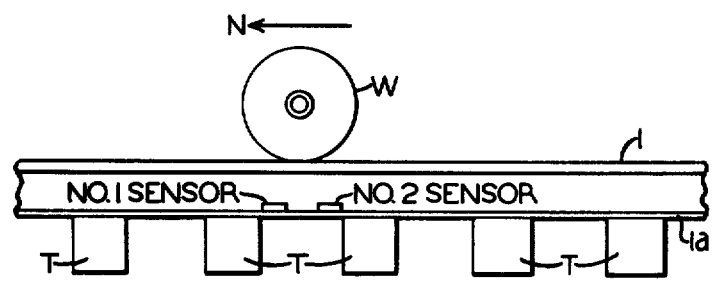
FIG. 5 is a side elevational view illustrating the disposition of a pair of strain gage sensing or detecting units in relation to a section of track rail which either may be located within the confines of a frictional-gripping type of a car retarder or may be situated at a selected location along the trackway.

It will be appreciated that a pair of detecting units, such as, sensors No. 1 and No. 2 are preferably employed at each detecting location or zone for sensing the passing of a vehicle wheel W as shown in FIG. 5. As previously mentioned, the two sensing units are spaced apart six inches or so on the flange 1a of the rail 1. Thus, after the disposition of both of the sensors, the metallic cover plate 12 is attached to the crossties T to protect the sensors from adverse climatic conditions.

Figure 6:
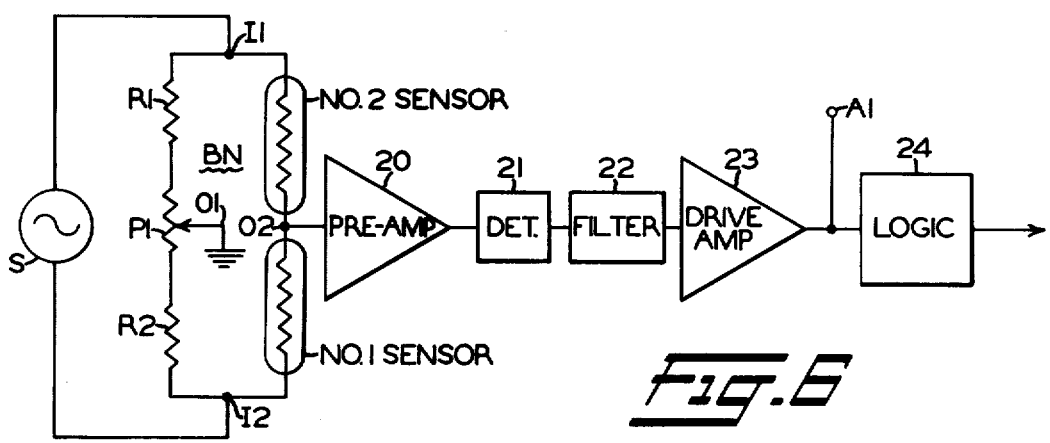
FIG. 6 is a schematic circuit diagram of an electronic circuit which may be utilized in conjunction with the sensing units to detect the presence of the wheels of railway vehicles.
Figure 7A:
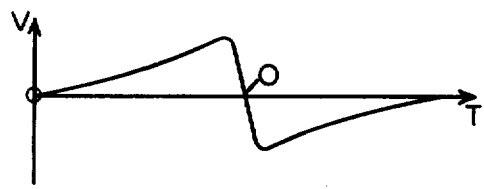
FIGS. 7A and 7B are illustrative graphs of the signal waveforms which are produced by the passing vehicle wheel as it moves in a different direction along the track rail.
Figure 7B:
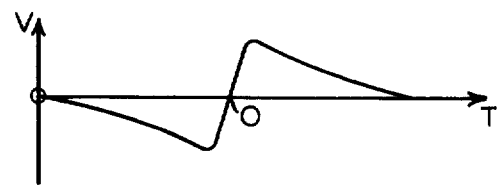

Turning now to FIG. 6, there is shown the schematic circuit which is operative in response to the passing wheel W of a railway vehicle to provide either the waveform as shown in FIG. 7A or the waveform as shown in FIG. 7B. As shown, the No. 1 and No. 2 sensors form two arms of a balanced differential bridge network BN. The other two arms of the bride BW consists of two fixed resistors R1 and R2 and an offset or fine balancing potentiometer P1 interconnecting the latter two arms to ground which forms one of the output terminals O1. The input terminals I1 and I2 of the resistive bridge network BN are connected to a source S of R.F. power signals. The other output terminal O2 which is formed between the common ends of resistance element sensors No. 1 and No. 2 is connected to the input of preamplifier 20. Initially, the differential bridge is balanced manually by adjustment of the movable wiper or sliding tap so that no R.F. signal is developed across the output terminals. The output from preamplifier circuit 20 is connected to the input of detector circuit 21 whose output is connected to the input of filter circuit 22. The output of filter 22 is connected to driver amplifier 23 and then to the input of the logic circuit 24. The output of driver amplifier 23 is also connected to the analog output signal terminal A1 which may be connected to an appropriate amplitude measuring device (not shown).

Let us now assume that the trackway lies in a North and South direction and that North is in the direction as indicated by the arrow in FIG. 5. Now, assume that a vehicle approaches the detection location from the North so the front wheel first passes over the No. 1 sensor and then passes over the No. 2 sensor as it travels along its route of travel. As the wheel W approaches the No. 1 sensor, the load or weight of the railway vehicle causes a compressive force to be imported to the head rail. The force is transmitted from the head through the web and to the flange portion and results in the tension stress of flange 1a. The resulting strain of the upper surface of flange 1a results in the elongation of the strain gage element 6 and causes an increase in the resistance of the No. 1 sensor. The resistive change in strain gage element 6 causes an unbalancing of the bridge BN and results in the amplitude modulation of the R.F. signals from source S as shown in FIG. 7A. That is, as the wheel W approaches sensor No. 1, the amplitude of the signal on terminal A1 gradually rises or increases until a maximum value is reached when the wheel is directly over the No. 1 sensor. As the wheel recedes from the No. 1 sensor, the amplitude begins to sharply decrease until a zero value is reached at a point when the wheel W is exactly equi-distance between the two sensors. Now, as the wheel W approaches the No. 2 sensor, the amplitude of the signal rapidly increases in a negative direction and peaks when the wheel W is directly above the No. 2 sensor. As the wheel W moves away from the No. 2 sensor, the amplitude gradually decreases toward a zero value. The amplitude modulated R.F. signals appearing across terminals O1 and O2 are amplified by the preamplifier circuit 20. The amplified signals are fed to the detecting circuit 21 where demodulation occurs to remove the R.F. carrier. The demodulated signal is passed through filter 21 and, in turn, is fed to the input of power driver amplifier 23. An amplified signal having a waveform as shown in FIG. 7A is developed on the output terminal A1 and is also fed to the input of the logic network 24 for processing and subsequent usage. Thus, the Southbound wheel W is readily detected and the transition at point O accurately represents the midway position of the passing wheel on the rail 1 at the detection location.

Similarly, if a Northbound railway vehicle is traveling along the trackway, a resultant curve as represented by the waveform of FIG. 7B will be produced as the wheel W first incurs the No. 2 sensor and then passes over the No. 1 sensor. Thus, it will be seen that the exact moment that the wheel W passes the midpoint between the two sensors can be readily ascertained by the zero transition of the waveform of FIG. 7B. After preamplification, detection and filtering, the demodulated signals are applied to the input of driver amplifier 23. The logic circuitry 24 may include suitable counters and storage circuits for counting and storing the number of wheels passing the detection location and may also include directional sensing circuits for determining the direction of movement of the railway vehicles passed the sensors. The logic may also include circuitry for timing the distance between the peaks, namely, the time elapsed between peaks, of the waveforms of FIGS. 7A and 7B to determine the speed of the railway vehicle. The analog output terminal may be connected to an amplitude measuring apparatus to determine the weight sustained by each axle of the railway vehicles.

It will be understood that while the invention finds particular utility in a wheel detecting arrangement for railway vehicle wheels in a car retarder installation, it is readily evident that the presently disclosed strain gage wheel sensors may be employed in other areas along the trackway. For example, the sensors may be disposed at the entrance end and/or exit end of the classification yard to detect incoming and outgoing trains and may likewise be used in a check-in/check out train detection system. Further, it will be apparent that various changes and modifications may be made to the presently described invention by those skilled in the art, and therefore, it is understood that all alterations, ramifications and equivalents which are within the spirit and scope of the invention are herein meant to be included in the appended claims.

Having thus described the invention, what I claim as new and desire to secure by Letters Patent, is:

1. A differential detecting device for sensing a passing object moving along a trackway comprising, a pair of sensing units each positioned at a given spaced location along the trackway, said sensing units each including a base support member and a strain gage element, each of said strain gage elements bonded to a respective one of said base support members, and clamping means for firmly holding said sensing units to the base flange of the trackway for allowing said strain gage elements to detect the stress which is imparted to the trackway under the load of the passing objects.

2. The differential detecting device as defined in claim 1, wherein each of said base support members includes a reduced central portion to which said strain gage element is bonded by adhesive material.

3. The differential detecting device as defined in claim 1, wherein said trackway includes standard track rails for supporting the wheels of railway vehicles.

4. The differential detecting device as defined in claim 3, wherein said sensing units are disposed on the base flange of one of said track rails, and a pair of C-shaped clamps hold said sensing units to the base flange of said one of said truck rails.

5. The differential detecting device as defined in claim 1, wherein said base support member is a rectangular insulative board including an upper planar surface to which said strain gage element is bonded.

6. The differential detecting device as defined in claim 1, wherein said base support member includes a pair of indentations for accommodating the tips of screws of said clamping means.

7. The differential detecting device as defined in claim 1, wherein a protective cover member is situated over said sensing units and is secured in place to shield said sensing units.

8. The differential detecting device as defined in claim 1, wherein each of said strain gage elements takes the form of a resistance element which changes its resistive value under the stress of the passing objects.

9. The differential detecting device as defined in claim 1, wherein each of said strain gage elements includes a pair of conductive leads which are connected to a differential bridge.

10. The differential detecting device as defined in claim 1, wherein said base support member is an elongated board which is disposed along the longitudinal axis of said track rail.

* * * * *